(12) United States Patent
Devereaux et al.

(10) Patent No.: US 9,818,158 B1
(45) Date of Patent: Nov. 14, 2017

(54) UTILIZING CREDIT AND INFORMATIC DATA FOR INSURANCE UNDERWRITING PURPOSES

(71) Applicant: United Services Automobile Association, San Antonio, TX (US)

(72) Inventors: Ramsey Devereaux, San Antonio, TX (US); David S. Franck, San Antonio, TX (US); Karen Moritz, San Antonio, TX (US); Spencer Read, Helotes, TX (US); Daniela Wheeler, Boerne, TX (US); Eric Vaith, San Antonio, TX (US); Erin McCaw, San Antonio, TX (US); Christopher Norman, San Antonio, TX (US); Jodi J. Healy, Johns Creek, GA (US); Bharat Prasad, San Antonio, TX (US); Kathleen L. Swain, Peoria, AZ (US); Michael J. Allen, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 14/305,732

(22) Filed: Jun. 16, 2014

Related U.S. Application Data

(60) Provisional application No. 61/948,192, filed on Mar. 5, 2014, provisional application No. 61/943,906, filed
(Continued)

(51) Int. Cl.
*G06Q 40/00* (2012.01)
*G06Q 40/08* (2012.01)
*G06Q 40/02* (2012.01)

(52) U.S. Cl.
CPC .......... *G06Q 40/08* (2013.01); *G06Q 40/025* (2013.01)

(58) Field of Classification Search
CPC ............................ G06Q 40/08; G06Q 40/025
(Continued)

(56) References Cited

U.S. PATENT DOCUMENTS 5,724,261 A 3/1998 Denny
6,526,807 B1 3/2003 Doumit et al.
(Continued)

FOREIGN PATENT DOCUMENTS

WO WO 2013/036677 3/2013

OTHER PUBLICATIONS

Telematics Set the Stage the Improved Auto Claims Management by Sam Friedman (Oct. 10, 2012); 3 pages.
(Continued)

*Primary Examiner* — Edward Baird
(74) *Attorney, Agent, or Firm* — Fish & Richardson P.C.

(57) ABSTRACT

A computer device and method for processing risk or loss related data to determine insurance underwriting, pricing, or other decisions contingent upon informatic and credit score data. An insurance underwriting decision is identified which is to be rendered regarding an insured. Informatic data is received from one or more of an insured property and vehicle associated with the insured. Credit score data relating to the insured is also received. Analytics is performed on the received informatic data and credit score data to determine the insurance underwriting, pricing, or other decision.

12 Claims, 5 Drawing Sheets

Related U.S. Application Data on Feb. 24, 2014, provisional application No. 61/943,901, filed on Feb. 24, 2014, provisional application No. 61/943,897, filed on Feb. 24, 2014, provisional application No. 61/926,532, filed on Jan. 13, 2014, provisional application No. 61/926,534, filed on Jan. 13, 2014, provisional application No. 61/926,541, filed on Jan. 13, 2014, provisional application No. 61/926,536, filed on Jan. 13, 2014, provisional application No. 61/926,095, filed on Jan. 10, 2014, provisional application No. 61/926,098, filed on Jan. 10, 2014, provisional application No. 61/926,091, filed on Jan. 10, 2014, provisional application No. 61/926,093, filed on Jan. 10, 2014, provisional application No. 61/926,114, filed on Jan. 10, 2014, provisional application No. 61/926,103, filed on Jan. 10, 2014, provisional application No. 61/926,111, filed on Jan. 10, 2014, provisional application No. 61/926,108, filed on Jan. 10, 2014, provisional application No. 61/926,123, filed on Jan. 10, 2014, provisional application No. 61/926,121, filed on Jan. 10, 2014, provisional application No. 61/926,119, filed on Jan. 10, 2014, provisional application No. 61/926,118, filed on Jan. 10, 2014, provisional application No. 61/866,779, filed on Aug. 16, 2013.

(58) Field of Classification Search
USPC .................................................. 705/4, 38
See application file for complete search history.

(56) References Cited

U.S. PATENT DOCUMENTS

| | | | |
|---|---|---|---|
| 6,766,322 B1 | 7/2004 | Bell | |
| 6,826,607 B1 | 11/2004 | Gelvin et al. | |
| 7,398,218 B1 | 7/2008 | Bernaski et al. | |
| 7,406,436 B1 | 7/2008 | Reisman | |
| 7,610,210 B2 | 10/2009 | Helitzer et al. | |
| 7,711,584 B2 | 5/2010 | Helitzer et al. | |
| 7,716,076 B1 | 5/2010 | Block et al. | |
| 7,809,587 B2 | 10/2010 | Dorai et al. | |
| 7,949,548 B2 | 5/2011 | Mathai et al. | |
| 8,004,404 B2 | 8/2011 | Izumi et al. | |
| 8,041,636 B1 | 10/2011 | Hunter et al. | |
| 8,086,523 B1 | 12/2011 | Palmer | |
| 8,229,767 B2 | 7/2012 | Birchall | |
| 8,271,303 B2 | 9/2012 | Helitzer | |
| 8,271,321 B1 | 9/2012 | Kestenbaum | |
| 8,289,160 B1 | 10/2012 | Billman | |
| 8,332,242 B1 | 12/2012 | Medina | |
| 8,400,299 B1 | 3/2013 | Maroney et al. | |
| 8,428,972 B1 | 4/2013 | Noles et al. | |
| 8,650,048 B1 | 2/2014 | Hopkins, III et al. | |
| 8,676,612 B2 | 3/2014 | Helitzer | |
| 8,731,975 B2 | 5/2014 | English et al. | |
| 8,760,285 B2 | 6/2014 | Billman et al. | |
| 8,788,299 B1 | 7/2014 | Medina | |
| 9,141,995 B1* | 9/2015 | Brinkmann | G06Q 40/08 |
| 2002/0032586 A1 | 3/2002 | Joao | |
| 2002/0087364 A1 | 7/2002 | Lerner | |
| 2002/0178033 A1 | 11/2002 | Yoshioka | |
| 2003/0040934 A1 | 2/2003 | Skidmore | |
| 2003/0097335 A1 | 5/2003 | Moskowitz et al. | |
| 2004/0039586 A1 | 2/2004 | Garvey et al. | |
| 2004/0064345 A1 | 4/2004 | Ajamian et al. | |
| 2004/0172304 A1 | 9/2004 | Joao | |
| 2005/0050017 A1* | 3/2005 | Ross et al. ............ 707/3 | |
| 2005/0055248 A1 | 3/2005 | Helitzer et al. | |
| 2005/0197847 A1* | 9/2005 | Smith | G06Q 10/06 705/39 |
| 2006/0026044 A1 | 2/2006 | Smith, II | |
| 2006/0218018 A1 | 9/2006 | Schmitt | |
| 2007/0005400 A1* | 1/2007 | Eggenberger | G06Q 40/08 705/4 |
| 2007/0005404 A1 | 1/2007 | Raz et al. | |
| 2007/0043803 A1 | 2/2007 | Whitehouse et al. | |
| 2007/0088579 A1 | 4/2007 | Richards, Jr. | |
| 2007/0118399 A1 | 5/2007 | Avinash et al. | |
| 2007/0156463 A1 | 7/2007 | Burton | |
| 2007/0174467 A1 | 7/2007 | Ballou et al. | |
| 2008/0033847 A1 | 2/2008 | McIntosh | |
| 2008/0052134 A1 | 2/2008 | Nowak et al. | |
| 2008/0065427 A1 | 3/2008 | Helitzer et al. | |
| 2008/0086320 A1 | 4/2008 | Ballew et al. | |
| 2008/0154651 A1 | 6/2008 | Kenefick et al. | |
| 2008/0154686 A1 | 6/2008 | Vicino | |
| 2008/0164769 A1 | 7/2008 | Eck | |
| 2008/0306799 A1 | 12/2008 | Sopko, III et al. | |
| 2009/0006175 A1 | 1/2009 | Maertz | |
| 2009/0109037 A1* | 4/2009 | Farmer | G06Q 20/102 340/576 |
| 2009/0177500 A1 | 7/2009 | Swahn | |
| 2009/0265193 A1 | 10/2009 | Collins et al. | |
| 2009/0265207 A1 | 10/2009 | Johnson | |
| 2009/0266565 A1 | 10/2009 | Char | |
| 2009/0279734 A1 | 11/2009 | Brown | |
| 2010/0131307 A1 | 5/2010 | Collopy et al. | |
| 2010/0174566 A1 | 7/2010 | Helitzer et al. | |
| 2010/0241464 A1* | 9/2010 | Amigo | G06Q 40/08 705/4 |
| 2010/0274859 A1 | 10/2010 | Bucuk | |
| 2011/0137684 A1 | 6/2011 | Peak et al. | |
| 2011/0137685 A1 | 6/2011 | Tracy et al. | |
| 2011/0161117 A1 | 6/2011 | Busque et al. | |
| 2011/0295624 A1 | 12/2011 | Chapin et al. | |
| 2011/0320226 A1 | 12/2011 | Graziano | |
| 2012/0016695 A1 | 1/2012 | Bernard | |
| 2012/0028635 A1 | 2/2012 | Borg et al. | |
| 2012/0101855 A1* | 4/2012 | Collins | G06Q 40/08 705/4 |
| 2012/0116820 A1* | 5/2012 | English | H04L 61/2007 705/4 |
| 2012/0158436 A1 | 6/2012 | Bauer et al. | |
| 2012/0176237 A1 | 7/2012 | Tabe | |
| 2012/0290333 A1 | 11/2012 | Birchall | |
| 2013/0040636 A1 | 2/2013 | Borg et al. | |
| 2013/0060583 A1 | 3/2013 | Collins | |
| 2013/0073303 A1* | 3/2013 | Hsu | H04L 12/2823 705/2 |
| 2013/0144658 A1 | 6/2013 | Schnabolk | |
| 2013/0226624 A1 | 8/2013 | Blessman et al. | |
| 2013/0317732 A1 | 11/2013 | Borg et al. | |
| 2014/0046701 A1 | 2/2014 | Steinberg et al. | |
| 2014/0108275 A1 | 4/2014 | Heptonstall | |
| 2014/0114693 A1 | 4/2014 | Helitzer et al. | |
| 2014/0132409 A1 | 5/2014 | Billman et al. | |
| 2014/0136242 A1 | 5/2014 | Weekes et al. | |
| 2014/0142989 A1 | 5/2014 | Grosso | |
| 2014/0180723 A1 | 6/2014 | Cote | |
| 2014/0195272 A1* | 7/2014 | Sadiq | G06Q 40/08 705/4 |
| 2014/0257862 A1 | 9/2014 | Billman | |
| 2014/0257863 A1* | 9/2014 | Maastricht | G06Q 40/08 705/4 |
| 2014/0278573 A1 | 9/2014 | Cook | |
| 2014/0322676 A1* | 10/2014 | Raman ............ 434/65 | |
| 2014/0358592 A1 | 12/2014 | Wedig et al. | |
| 2014/0380264 A1* | 12/2014 | Misra | G06F 8/00 717/100 |
| 2015/0006206 A1 | 1/2015 | Mdeway | |
| 2015/0221051 A1 | 8/2015 | Settino | |
| 2016/0005130 A1 | 1/2016 | Devereaux et al. | |
| 2016/0104250 A1 | 4/2016 | Allen et al. | |

OTHER PUBLICATIONS

U.S. Appl. No. 14/862,776, Devereaux et al., filed Sep. 23, 2015.
U.S. Appl. No. 14/251,392, Allen et al., filed Apr. 11, 2014.
U.S. Appl. No. 14/251,377, Devereaux et al., filed Apr. 11, 2014.
U.S. Appl. No. 14/251,404, Devereaux et al., filed Apr. 11, 2014.

(56) References Cited

OTHER PUBLICATIONS

U.S. Appl. No. 14/251,411, Allen et al., filed Apr. 11, 2014.
U.S. Appl. No. 14/273,877, Allen et al., filed May 9, 2014.
U.S. Appl. No. 14/273,889, Devereaux et al., filed May 9, 2014.
U.S. Appl. No. 14/273,918, Allen et al., filed May 9, 2014.
U.S. Appl. No. 14/278,182, Allen et al., filed May 15, 2014.
U.S. Appl. No. 14/278,202, Allen et al., filed May 15, 2014.
U.S. Appl. No. 14/303,336, Devereaux et al., filed Jun. 12, 2014.
U.S. Appl. No. 14/303,347, Devereaux et al., filed Jun. 12, 2014.
U.S. Appl. No. 14/303,370, Allen et al., filed Jun. 12, 2014.
U.S. Appl. No. 14/303,382, Allen et al., filed Jun. 12, 2014.
U.S. Appl. No. 14/324,534, Devereaux et al., filed Jul. 7, 2014.
U.S. Appl. No. 14/324,546, Devereaux et al., filed Jul. 7, 2014.
U.S. Appl. No. 14/324,609, Devereaux et al., filed Jul. 7, 2014.
U.S. Appl. No. 14/324,618, Devereaux et al., filed Jul. 7, 2014.
U.S. Appl. No. 14/324,748, Devereaux et al., filed Jul. 7, 2014.
U.S. Appl. No. 14/324,759, Devereaux et al., filed Jul. 7, 2014.
U.S. Appl. No. 15/244,847, Devereaux et al., filed Aug. 23, 2016.
U.S. Appl. No. 61/800,561, Sanidas et al., filed Mar. 15, 2013.
U.S. Appl. No. 61/866,779, Bergner, filed Aug. 16, 2013.
U.S. Appl. No. 61/926,091, Allen et al., filed Jan. 10, 2014.
U.S. Appl. No. 61/926,093, Allen et al., filed Jan. 10, 2014.
U.S. Appl. No. 61/926,095, Allen et al., filed Jan. 10, 2014.
U.S. Appl. No. 61/926,098, Allen et al., filed Jan. 10, 2014.
U.S. Appl. No. 61/926,103, Devereaux et al., filed Jan. 10, 2014.
U.S. Appl. No. 61/926,108, Allen et al., filed Jan. 10, 2014.
U.S. Appl. No. 61/926,111, Allen et al., filed Jan. 10, 2014.
U.S. Appl. No. 61/926,114, Devereaux et al., filed Jan. 10, 2014.
U.S. Appl. No. 61/926,118, Devereaux et al., filed Jan. 10, 2014.
U.S. Appl. No. 61/926,119, Devereaux et al., filed Jan. 10, 2014.
U.S. Appl. No. 61/926,121, Devereaux et al., filed Jan. 10, 2014.
U.S. Appl. No. 61/926,123, Devereaux et al., filed Jan. 10, 2014.
U.S. Appl. No. 61/926,532, Allen et al., filed Jan. 13, 2014.
U.S. Appl. No. 61/926,534, Allen et al., filed Jan. 13, 2014.
U.S. Appl. No. 61/926,536, Allen et al., filed Jan. 13, 2014.
U.S. Appl. No. 61/926,541, Allen et al., filed Jan. 13, 2014.
U.S. Appl. No. 61/943,897, Devereaux et al., filed Feb. 24, 2014.
U.S. Appl. No. 61/943,901, Devereaux et al., filed Feb. 24, 2014.
U.S. Appl. No. 61/943,906, Devereaux et al., filed Feb. 24, 2014.
U.S. Appl. No. 61/948,192, Davis et al., filed Mar. 5, 2014.
U.S. Appl. No. 62/311,491, Moy, filed Mar. 22, 2016.
U.S. Appl. No. 62/325,250, Rodgers et al., filed Apr. 20, 2016.
U.S. Appl. No. 62/351,427, Devereaux et al., filed Jun. 17, 2016.
U.S. Appl. No. 62/351,441, Flachsbart et al., filed Jun. 17, 2016.
U.S. Appl. No. 62/351,451, Chavez et al., filed Jun. 17, 2016.

Zevnik, Richard. The Complete Book of Insurance. Sphinx. 2004. pp. 76-78.
U.S. Appl. No. 14/251,377, filed Apr. 11, 2014, Devereaux et al.
U.S. Appl. No. 14/251,392, filed Apr. 11, 2014, Allen et al.
U.S. Appl. No. 14/251,404, filed Apr. 11, 2014, Devereaux et al.
U.S. Appl. No. 14/251,411, filed Apr. 11, 2014, Allen et al.
U.S. Appl. No. 14/273,877, filed May 9, 2014, Allen et al.
U.S. Appl. No. 14/273,889, filed May 9, 2014, Devereaux et al.
U.S. Appl. No. 14/273,918, filed May 9, 2014, Allen et al.
U.S. Appl. No. 14/278,182, filed May 15, 2014, Allen et al.
U.S. Appl. No. 14/278,202, filed May 15, 2014, Allen et al.
U.S. Appl. No. 14/303,336, filed Jun. 12, 2014, Devereaux et al.
U.S. Appl. No. 14/303,347, filed Jun. 12, 2014, Devereaux et al.
U.S. Appl. No. 14/303,370, filed Jun. 12, 2014, Allen et al.
U.S. Appl. No. 14/303,382, filed Jun. 12, 2014, Allen et al.
U.S. Appl. No. 14/305,732, filed Jun. 16, 2014, Devereaux et al.
U.S. Appl. No. 14/324,534, filed Jul. 7, 2014, Devereaux et al.
U.S. Appl. No. 14/324,546, filed Jul. 7, 2014, Devereaux et al.
U.S. Appl. No. 14/324,609, filed Jul. 7, 2014, Devereaux et al.
U.S. Appl. No. 14/324,618, filed Jul. 7, 2014, Devereaux et al.
U.S. Appl. No. 14/324,748, filed Jul. 7, 2014, Devereaux et al.
U.S. Appl. No. 14/324,759, filed Jul. 7, 2014, Devereaux et al.
U.S. Appl. No. 14/494,207, filed Sep. 23, 2014, Campbell.
U.S. Appl. No. 14/572,413, filed Dec. 16, 2014, Devereaux et al.
U.S. Appl. No. 14/573,981, filed Dec. 15, 2014, Allen et al.
U.S. Appl. No. 14/862,776, filed Sep. 23, 2015, Devereaux et al.
U.S. Appl. No. 14/941,225, filed Nov. 13, 2015, Billman et al.
U.S. Appl. No. 14/941,262, filed Nov. 13, 2015, Hopkins et al.
U.S. Appl. No. 15/244,847, filed Aug. 23, 2016, Devereaux et al.
U.S. Appl. No. 15/365,555, filed Nov. 30, 2016, Devereaux et al.
U.S. Appl. No. 15/365,611, filed Nov. 30, 2016, Devereaux et al.
U.S. Appl. No. 15/365,676, filed Nov. 30, 2016, Devereaux et al.
U.S. Appl. No. 15/365,706, filed Nov. 30, 2016, Devereaux et al.
U.S. Appl. No. 15/365,721, filed Nov. 30, 2016, Devereaux et al.
U.S. Appl. No. 15/365,725, filed Nov. 30, 2016, Devereaux et al.
U.S. Appl. No. 15/365,736, filed Nov. 30, 2016, Devereaux et al.
U.S. Appl. No. 15/365,745, filed Nov. 30, 2016, Devereaux et al.
U.S. Appl. No. 15/365,754, filed Nov. 30, 2016, Devereaux et al.
U.S. Appl. No. 15/365,764, filed Nov. 30, 2016, Devereaux et al.
U.S. Appl. No. 15/365,773, filed Nov. 30, 2016, Devereaux et al.
U.S. Appl. No. 15/365,786, filed Nov. 30, 2016, Devereaux et al.
Farmers Next Generation Homeowners Policy, Missouri, by Farmers insurance Exchange; 2008; 50 pages.
Gonzalez Ribeiro, Ana, "Surprising things your home insurance covers," Jan. 12, 2012 in Insurance; 4 pages.

\* cited by examiner

UTILIZING CREDIT AND INFORMATIC DATA FOR INSURANCE UNDERWRITING PURPOSES

CROSS REFERENCE TO RELATED APPLICATIONS

This application claims priority to U.S. Patent Application Ser. Nos. 61/866,779 filed Aug. 16, 2013; 61/926,093 filed Jan. 10, 2014; 61/926,091 filed Jan. 10, 2014; 61/926,095 filed Jan. 10, 2014; 61/926,098 filed Jan. 10, 2014; 61/926,103 filed Jan. 10, 2014; 61/926,108 filed Jan. 10, 2014; 61/926,111 filed Jan. 10, 2014; 61/926,114 filed Jan. 10, 2014; 61/926,118 filed Jan. 10, 2014; 61/926,119 filed Jan. 10, 2014; 61/926,121 filed Jan. 10, 2014; 61/926,123 filed Jan. 10, 2014; 61/926,536 filed Jan. 13, 2014; 61/926,541 filed Jan. 13, 2014; 61/926,534 filed Jan. 13, 2014; 61/926,532 filed Jan. 13, 2014; 61/943,897 filed Feb. 24, 2014; 61/943,901 filed Feb. 24, 2014; 61/943,906 filed Feb. 24, 2014; and 61/948,192 filed Mar. 5, 2014 which are each incorporated herein by reference in its entirety.

FIELD OF THE INVENTION

The disclosed embodiments generally relate to a method and computerized system for managing insurance and related products and services, and more particularly, to using data captured from an insured property for determining underwriting, pricing, and other insurance related decisions.

BACKGROUND OF THE INVENTION

Smart home functionality is a maturing space, but the opportunity for insurance companies remains largely untapped. Currently, there are few useful early warning and loss mitigation systems that actually save costs and time for both the property owner and insurance company alike. For instance, currently, homeowners insurance claim events are detected by the homeowner, who contacts the insurance company to inform them that there has been a loss. However, the loss could be mitigated with automated warning and detection systems that interface with the insurance company systems. For example, homeowners may not become aware of minor to medium hail damage to their roofs until such time as that damage leads to water damage to the interior or exterior of the home. If they could be made aware of such loss events earlier and then take corrective actions, then the increased damage could have been mitigated or avoided.

Another maturing space concerns vehicle telematics in which the latest developments in automotive electronics are dealing with the automatic monitoring of the state of a vehicle. Such monitoring is based on the integration of numerous sensors into the vehicle such that important functional parts and components may be monitored. It is becoming of increasing interest to collect a variety of information, regarding different aspects of a vehicle, which may have different applications depending on their usage. The use of telematics in automobiles has become more common in recent years, particularly as implemented with in-car navigation systems.

Finally, another maturing area relates to the use of credit information, such as a credit score or credit history, in making underwriting, pricing or other decisions about the terms and conditions on which to offer or provide insurance coverage. Such use involves modeling and making determinations as to whether there is a correlation between a person's credit information and the person's risk profile (which may affects the person's insurance rates).

In this regard, there is utility and functionality to be provided by utilizing smart home and vehicle telematics data with credit information, as factors in formulating the terms of an insurance policy to be issued or offered.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a computer device and method for processing risk or loss related data to determine insurance underwriting, pricing, or other decisions contingent upon informatic and credit score data is provided. An insurance underwriting decision is identified which is to be rendered regarding an insured. Informatic data is received from one or more of an insured property and vehicle associated with the insured. Credit score data relating to the insured is also received. Analytics is performed on the received informatic data and credit score data to determine the insurance underwriting, pricing, or other decision.

In another aspect, numerous sensors may be installed in a vehicle in order to measure and/or record a variety of information, regarding different aspects of the vehicle. For example, the sensors may record information such as movements, status and behavior of a vehicle, or any other factors. The information captured by the vehicle telematics may be utilized, for example, to ensure that the premiums policyholders are paying are reflective of their driving style and the way their vehicle is used. In another aspect, a determination is made as to whether the received credit score data is to be utilized to determine the insurance underwriting, pricing, or other decision. In yet another aspect, a weighted value for the received credit score data is determined to be utilized to determine the insurance underwriting, pricing, or other decision.

This summary section is provided to introduce a selection of concepts in a simplified form that are further described subsequently in the detailed description section. This summary section is not intended to identify key features or essential features of the claimed subject matter, nor is it intended to be used to limit the scope of the claimed subject matter.

BRIEF DESCRIPTION OF THE DRAWINGS

The accompanying appendices and/or drawings illustrate various non-limiting, examples, inventive aspects in accordance with the present disclosure.

DETAILED DESCRIPTION OF CERTAIN EMBODIMENTS

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety. For instance, commonly assigned U.S. Pat. Nos. 8,289,160 and 8,400,299 are related to certain embodiments described here and are each incorporated herein by reference in their entirety. This application additionally relates to U.S. patent application Ser. No. 13/670,328 filed Nov. 6, 2012, which claims continuation priority to U.S. patent application Ser. No. 12/404,554 filed Mar. 16, 2009 which are incorporated herein by reference in their entirety.

As used herein, the term "insurance policy" refers to a contract between an insurer, also known as an insurance company, and an insured, also known as a policyholder, in which the insurer agrees to indemnify the insured for specified losses, costs, or damage on specified terms and conditions in exchange of a certain premium amount paid by the insured. In a typical situation, when the insured suffers some loss for which he/she may have insurance the insured makes an insurance claim to request payment for the loss. It is to be appreciated for the purpose of the embodiments illustrated herein, the insurance policy is not to be understood to be limited to a residential or homeowners insurance policy, but can be for a commercial, umbrella, and other insurance policies known by those skilled in the art.

As also used herein, "insured" may refer to an applicant for a new insurance policy and/or may refer to an insured of an existing insurance policy.

As used herein, the term "insurance policy" may encompass a warranty or other contract for the repair, service, or maintenance of insured property.

As used herein, "insured property" means a dwelling, other buildings or structures, personal property, or business property, as well as the premises on which these are located, some or all which may be covered by an insurance policy.

As used herein, "decision", when referenced regarding an insurance policy, means a decision to modify an insurance policy's terms or conditions if permitted by the terms of the policy, a decision to condition renewal or continuation of the policy on certain modifications, a decision to terminate or cancel the insurance policy, and/or a decision to offer or recommend modifications to the policy's terms or conditions that the insured may accept or reject.

As used herein, "underwriting decisions" encompasses pricing decisions for an insurance policy.

Figure 1:
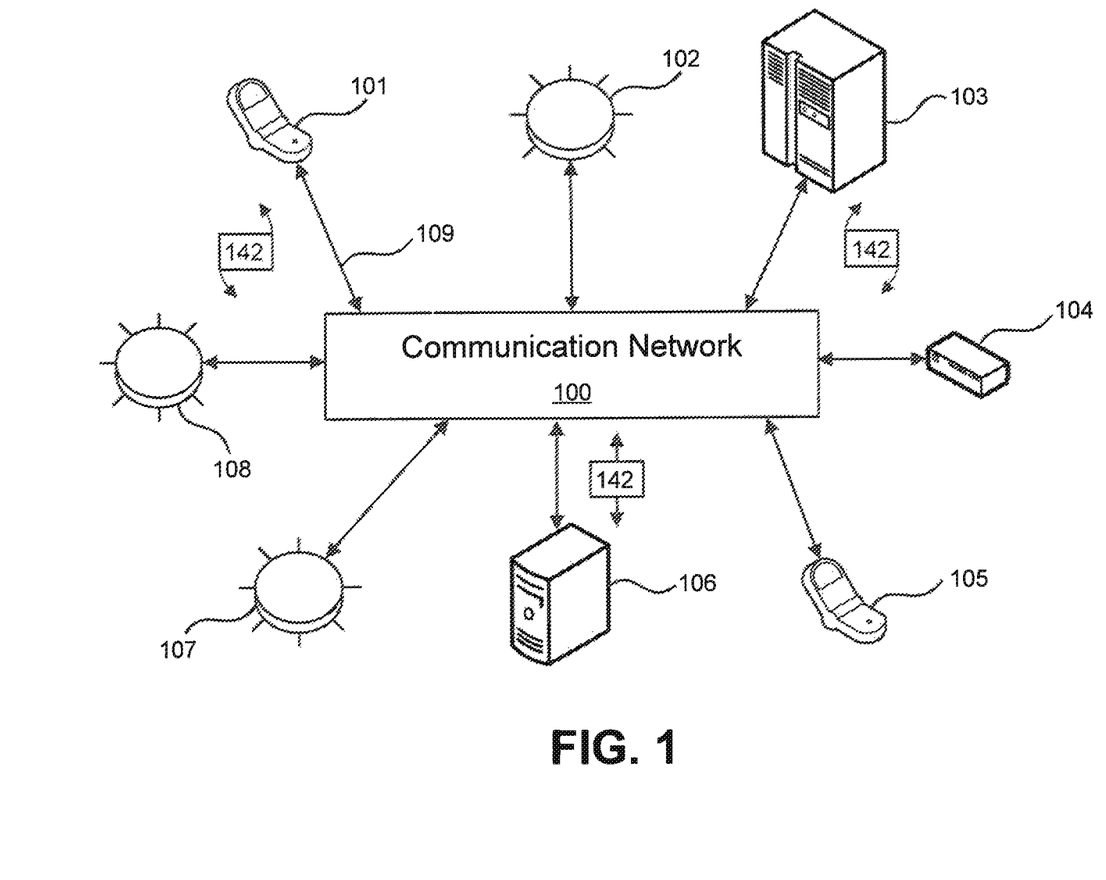
FIG. 1 illustrates an example communication network in accordance with an illustrated embodiment.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as an insured property 300 or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, servers 106, routers 107, switches 108 and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
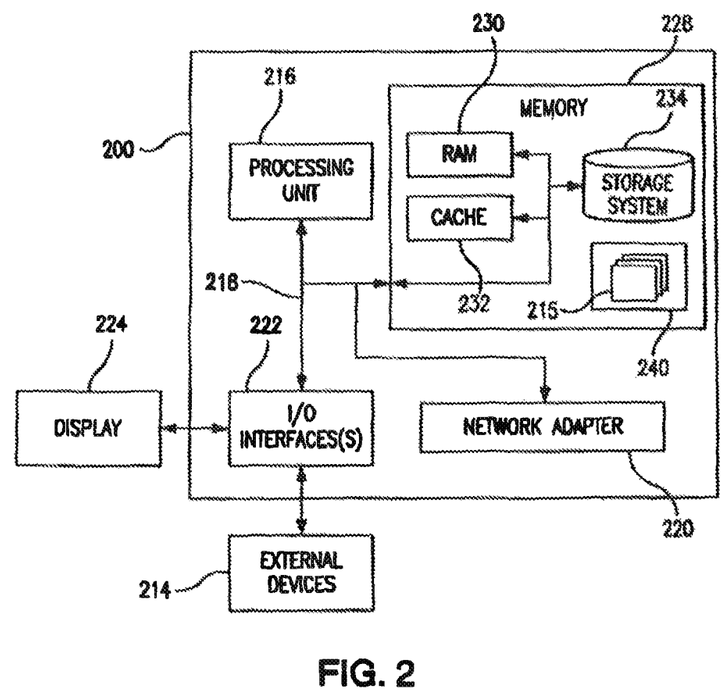
FIG. 2 illustrates a network computer device/node in accordance with an illustrated embodiment.

FIG. 2 is a schematic block diagram of an example network computing device 200 (e.g., one of network devices 101-108) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessorbased systems, set top boxes, programmable consumer electronics, network PCs, minicomputer systems, mainframe computer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as data analyzer module 306 described below, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
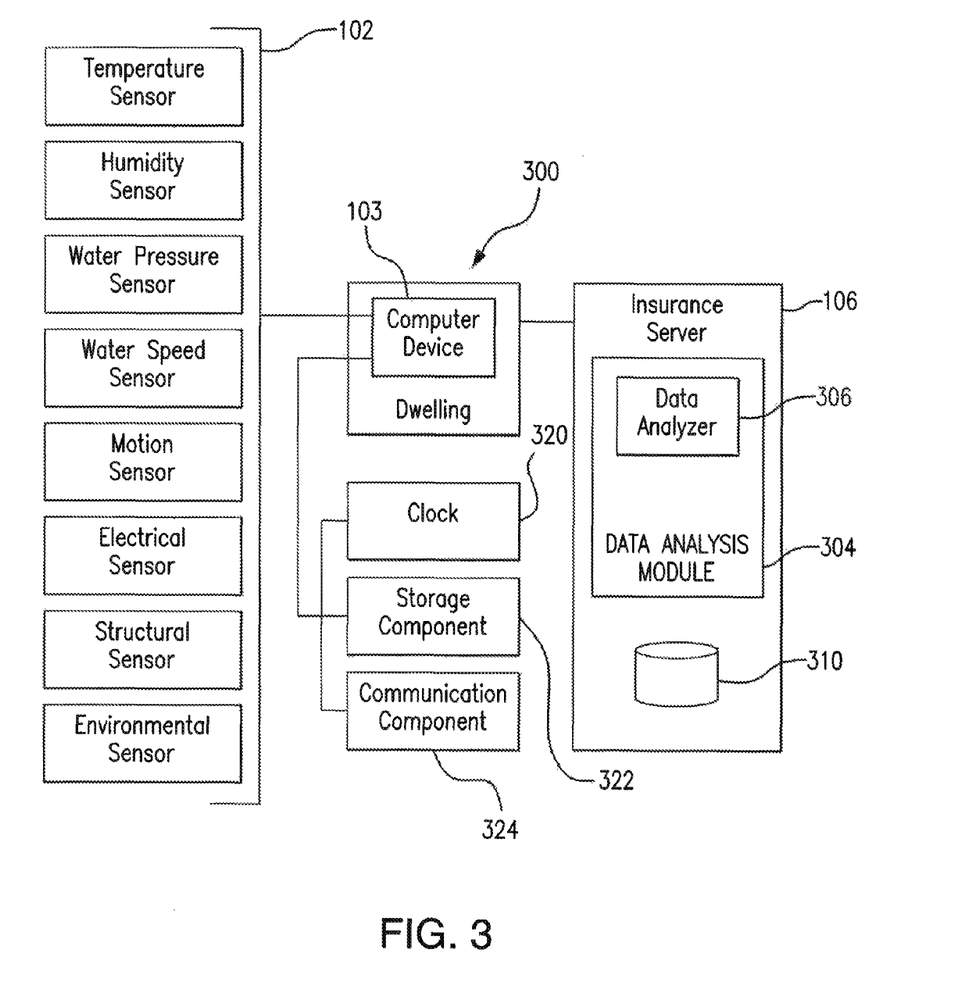
FIG. 3 is a block diagram of an insured property from which sensor data is captured for subsequent analysis in accordance with an illustrated embodiment.

With the exemplary communication network 100 (FIG. 1) and computing device 200 (FIG. 2) being generally shown and discussed above, description of certain illustrated embodiments of the present invention will now be provided. With reference now to FIG. 3, an example of an insured property 300 is shown which is to be understood to be any type of structure (e.g., residential, commercial, retail, municipal, etc.) in which the capture and analysis of sensor data (102) is useful for the reasons at least described below. Insured property 300 preferably includes a computing device 103 for capturing data from a plurality of sensors 102 which capture data regarding various aspects of insured property 300, as further described below. It is to be understood computing device 103 may be located in any location, and its position is not limited to the example shown.

Computing device 103 is preferably configured and operational to receive (capture) data from various sensors 102 regarding certain aspects (including functional and operational) of insured property 300 (described further below) and transmit that captured data to a remote server 106, via network 100. It is noted device 103 may perform analytics regarding the captured sensor data regarding insured property 300 and/or the remote server 106, preferably controlled by an insurance company/carrier, may perform such analytics, as also further described below. It is also to be understood in other embodiments, data from sensors 102 may be transmitted directly to remote server 106, via network 100, thus either obviating the need for computing device 103 or mitigating its functionality to capture all data from sensors 102.

In the illustrated embodiment of FIG. 3, computing device 103 is shown coupled to various below described sensor types 102. Although various sensor types 102 are described below and shown in FIG. 3, the sensor types 102 described and shown herein are not intended to be exhaustive as embodiments of the present invention may encompass any type of known or unknown sensor type which facilitates the purposes and objectives of the certain illustrated embodiments described herein. It is to be understood and appreciated that all sensor, camera and telematics devices referenced herein for capturing data relating to an insured are typically installed with the insured's permission and all data is to be collected, maintained, and used with the insured's permission and subject to appropriate security and privacy protections. Exemplary sensor types 102 include (but are not limited to):

Temperature sensor—configured and operational to preferably detect the temperature present at the insured property 300. For example, the temperature may rise and fall with the change of seasons and/or the time of day. Moreover, in the event of a fire, the temperature present at the insured property 300 may rise quickly—possibly to a level of extreme high heat. The temperature sensor may make use of probes placed at various locations in and around the insured property 300, in order to collect a representative profile of the temperature present at the insured property 300. These probes may be connected to device 103 by wire, or by a wireless technology. For example, if device 103 is positioned in the attic of the insured property 300, the temperature may be higher than the general temperature present in the dwelling. Thus, probes placed at various locations (e.g., in the basement, on the various levels of a multi-level property 300, in different rooms that receive different amounts of sun, etc.), in order to obtain an accurate picture of the temperature present at the dwelling. Moreover, device 103 may record both the indoor and outdoor temperature present at the insured property 300. For example, data about the indoor temperature, the outdoor temperature, and/or the differential between indoor and outdoor temperatures, may be used as part of some analysis model, and thus all of the different values could be stored. Device 103 may store an abstract representation of temperature (e.g., the average indoor temperature, as collected at all of the probes), or may store each temperature reading individually so that the individual readings may be provided as input to an analysis model.

Humidity sensor—configured and operational to preferably detect the humidity present at the insured property 300. Humidity sensor may comprise the humidity-detection hardware, or may employ one or more remote probes, which may be located inside and/or outside the insured property 300. Humidity readings from one or more locations inside and/or outside the insured property could thus be recorded by device 103.

Water Sensor(s)/Water pressure sensor(s)—configured and operational to preferably monitor water related conditions, including (but not limited to): the detection of water and water pressure detection, for instance in the plumbing system in the insured property 300. With regards to a water pressure sensor, it may have one or more probes attached to various locations of the dwelling's 300 plumbing, and thus device 103 may record the pressure present in the plumbing, and/or any changes in that pressure. For example, plumbing systems may be designed to withstand a certain amount of pressure, and if the pressure rises above that amount, the plumbing system may be at risk for leaking, bursting, or other failure. Thus, device 103 may record the water pressure (and water flow) that is present in the plumbing system at various points in time. An analysis model could use the information about water pressure in various ways such as rating the home insurance, tracking water pressure, and/or providing advice and guidance.

Water flow sensor—configured and operational to preferably monitor water flow rate in the plumbing system in the insured property 300. Water flow sensor may have one or more probes attached to various locations of the insured property's 300 plumbing, such as faucets, showerheads and appliances, and thus device 103 may record the amount of water flowing through the insured property's 300 water supply system. Thus, device 103 may record the water flow that is present in the plumbing system at various points in time. An analysis model could use the information about water flow in various ways such as rating the home insurance, tracking water consumption, or providing advice and guidance. The readings of the amount of water used at insured property 300 can be used to analyze and forecast an expected water bill.

Leak detection sensor—configured and operational to preferably monitor the presence of leaks from gas and water plumbing pipes both inside and outside the walls of the insured property 300. The leak detection sensor may have one or more probes attached to various locations of the insured property's 300 plumbing and piping, and thus device 103 may record the fact that there is a gas or water leak. An example of this is that a leak detection sensor can be placed behind the washing machine. If the hoses that connect the washing machine to the water line were to break the leak detection sensor would know that there was a water leak and notify the insured and/or the insurance company. The insured can also give prior authorization to the insurance company to act on their behalf to correct the water leak. An analysis model could use the information about how often the leak detection sensor alerts, whether the insured uses leak detection sensor(s), and where they are placed in various ways such as rating the home insurance, tracking water pressure, and/or providing advice and guidance.

Wind speed sensor—configured and operational to record the wind speed present at the insured property 300. For example, one or more wind speed sensors may be placed outside the insured property 300, as the wind speed and/or direction may be recorded at various points in time. Device 103 may record these wind speed and/or wind direction readings. The wind speed may be used by an analysis model to plan for future losses and/or to make underwriting decisions.

Motion sensor—configured and operational to sense motion in the insured property 300 to which device 300 is attached. Typically, insured property 300 does not move significantly, except in the event of a catastrophe. Motion sensor may indicate that the insured property 300 is sliding down a hill (e.g., in the event of an extreme flood or mudslide), or is experiencing a measurable earthquake. A motion sensor may further include earth sensors for detecting sink holes and earth movement. In addition, a motion sensor may be configured and operational to sense the motion of objects within the insured property.

Electrical system sensor/analyzer—configured and operational to assess the condition of the insured property's 300 electrical system. For example, potentiometers may be connected to various points in the insured property's 300 electrical system to measure voltage. Readings from the potentiometers could be used to determine if the voltage is persistently too high, or too low, or if the voltage frequently drops and/or spikes. Such conditions may suggest that the insured property 300 is at risk for fire. Other types of electrical measurements could be taken, such as readings of current flowing through the electrical system. Any type of data about the insured property's 300 electrical system could be captured by device 103. An analysis model could use the information about electrical energy in various ways such as rating the home insurance, tracking energy consumption, or providing advice and guidance.

Positional sensor—configured and operational to record the position of device 103. For example, the positional sensor may be, or may comprise, a Global Positioning System (GPS) receiver, which may allow the position of device 103 to be determined. Or, as another example, positional sensor may use triangulation technology that communicates with fixed points (such as wireless communication towers) to determine its position. While an insured property 300 normally does not move, positional sensor may allow device 103 to be recovered in the event of a catastrophe. For example, if a insured property 300 explodes, or is otherwise catastrophically damaged, device 103 may be propelled to an unknown location. Positional sensor may indicate the geographical area of an insured property 300 which an analysis model could use in various ways. Positional sensor may record the position of device 103, which device 103 could communicate to an external source, thereby allowing device 103 to be found.

Structural sensor—configured and operational to preferably detect various structural conditions relating to insured property 300. A structural sensor may comprise detection hardware, or may employ one or more remote probes, which may be located inside and/or outside the insured property 300. Conditions recorded by structural sensor may include (but are not limited to) the condition of the wall structure, floor structure, ceiling structure and roof structure of insured property 300, which may be achieved via: load bearing detectors; components which measure the slope of a floor/wall/ceiling; carpet conditions (e.g., via nano sensor) or any other components functional to detect such conditions. Structural readings from one or more locations inside and/or outside the insured property 300 could thus be recorded by device 103 and used by an analysis model in various ways.

Environmental Sensor—configured and operational to preferably detect various environmental conditions relating to insured property 300. An environmental sensor may comprise detection hardware, or may employ one or more remote probes, which may be located inside and/or outside the insured property 300. Conditions recorded by an environmental sensor may include (but are not limited to) the air quality present in insured property 300, the presence of mold/bacteria/algae/lead paint or any contaminant adverse to human health (whether airborne or attached to a portion of the structure of insured property 300). Such environmental readings from one or more locations inside and/or outside the insured property 300 could thus be recorded by device 103 and used by an analysis model in various ways.

Appliance Sensor—configured and operational to preferably detect various operating parameters relating to appliances within an insured property 300. Examples of appliances include (but are not limited to) all kitchen appliances (e.g., refrigerator, freezer, stove, cooktop, oven, grill, dishwasher, etc.); HVAC components (air conditioner, heating system, air handlers, humidifiers/de-humidifiers, etc.), water purification system, media entertainment system (e.g., televisions), networking components (routers, switches, extenders, etc.), electrical generator system, pool filtration and heating system, garage door openers, sump pump and water well system, septic tank system, garage door opener, etc. An appliance sensor may comprise detection hardware, or may employ one or more remote probes, which may be located inside and/or outside the insured property 300 functional to detect certain operating parameters of appliances. Operating parameters detected by an appliance sensor may include (but are not limited to): the operating efficiency of an appliance (energy usage, output performance); the time an appliance operates, the age of an appliance; maintenance needs of an appliance (e.g., change a filter component or schedule a periodic examination/tune-up); and repair needs of an appliance (which may also include the identification of parts needed). Such appliance readings from one or more appliances could thus be recorded by device 103 and used by an analysis model in various ways.

With exemplary sensors 102 identified and briefly described above, and as will be further discussed below, it is to be generally understood sensors 102 preferably record certain data parameters relating to products and services provided by an insurance carrier, such as USAA, to facilitate a decision making process as described below. It is to be understood and appreciated the aforementioned sensors 102 may be configured as wired and wireless types integrated in a networked environment (e.g., WAN, LAN, WiFi, 802.11X, 3G, LTE, etc.), which may also have an associated IP address. It is to be further appreciated the sensors 102 may consist of internal sensors located within the structure of insured property 300; external sensors located external of the structure of insured property 300; sound sensors for detecting ambient noise (e.g., for detecting termite and rodent activity, glass breakage, intruders, etc.). It is additionally to be understood and appreciated that sensors 102 can be networked into a central computer hub (e.g., device 103) in an insured property to aggregate collected sensor data packets. Aggregated data packets can be analyzed in either a computer system (e.g., device 103) or via an external computer environment (e.g., server 106). Additionally, it is to be understood data packets collected from sensors 102 can be aggregated in computing device 103 and sent as an aggregated packet to server 106 for subsequent analysis whereby data packets may be transmitted at prescribed time intervals (e.g., a benefit is to reduce cellular charges in that some insured properties 300 may not have Internet access or cellular service is backup when Internet service is nonfunctioning).

In accordance with an illustrated embodiment, in addition to the aforementioned, the sensors 102 being utilized relative to insured property 300, computing device 103 may additionally be coupled to a Clock 320 which may keep track of time for device 103, thereby allowing a given item of data to be associated with the time at which the data was captured. For example, device 103 may recurrently detect various environmental conditions relating to insured property 300, recurrently capture images of various portions of the structure of insured property 300, etc., and may timestamp each reading and each image. The time at which the readings are taken may be used to reconstruct events or for other analytic purposes, such as those described below. For example, the timestamps on measurements taken be a leak detection sensor may enable data analyzer 306 to determine certain trends in addressing either preventive or immediate maintenance/repair needs.

A storage component 322 may further be provided and utilized to store data readings and/or timestamps in device 103. For example, storage component 322 may comprise, or may otherwise make use of, magnetic or optical disks, volatile random-access memory, non-volatile random—access memory or any other type of storage device. There may be sufficient data storage capacity to store several days or several weeks worth of readings. For example, there might be various plumbing issues which can affect the water pressure in a plumbing system to be low. Storage component 322 might have sufficient storage capacity to allow, for example five days of readings to be stored, thereby allowing narrowing down the cause of low water pressure.

A communication component 324 may further be provided and utilized to communicate recorded information from computing device 103 to an external location, such as computer server 106, which may be associated with an insurance carrier such as USAA. Communication component 324 may be, or may comprise, a network communication card such as an Ethernet card, a WiFi card, or any other communication mechanism. However, communication component 324 could take any form and is not limited to these examples. Communication component 324 might encrypt data that it communicates, in order to protect the security and/or privacy of the data. Communication component 324 may communicate data recorded by device 103 (e.g., data stored in storage component 322) to an external location, such as server 106. For example, server 106 may be operated by an insurance company, and may collect data from computing device 103 to learn about risks, repair needs and other analytics related to insured property 300 in which device 103 is located. Communication component 324 may initiate communication sessions with server 106. Or, as another example, server 106 may contact device 103, through communication component 324, in order to receive data that has been stored by device 103. Additionally, data from sensors 102, clock 320 and/or storage component 322 may be communicated directly to server 106, via network 100, thus obviating or mitigating the need for computing device 103.

In the example of FIG. 3, communication component 324 (which is shown, in FIG. 3, as being part of, or used by, computing device 103) communicates data to server 106. Server 106 may comprise, or otherwise may cooperate with, a data analysis module 304, which may analyze data in some manner. Data analysis module 304 may comprise various types of sub-modules, such as data analyzer 306, credit analyzer 307, and composite risk analyzer 308.

In general, data analyzer 306 may perform an analysis of collected data regarding various attributes of insured property 300, such as, for example, but not limited to, one or more utility systems associated with the insured property 300, structural condition of the insured property 300 and environmental conditions detected in the vicinity of the insured property 300. In another aspect, data analyzer 306 may be also configured and operable to analyze information, regarding different aspects of a vehicle, such as, for example, but not limited to, movements, status and behavior of a vehicle and/or other aspects that may be used to generate an insurance profile of a policyholder associated with insured property 300. Server 106 may further comprise, or otherwise may cooperate with, a data repository 310, which may store captured informatics sensor data and information.

Figure 4:
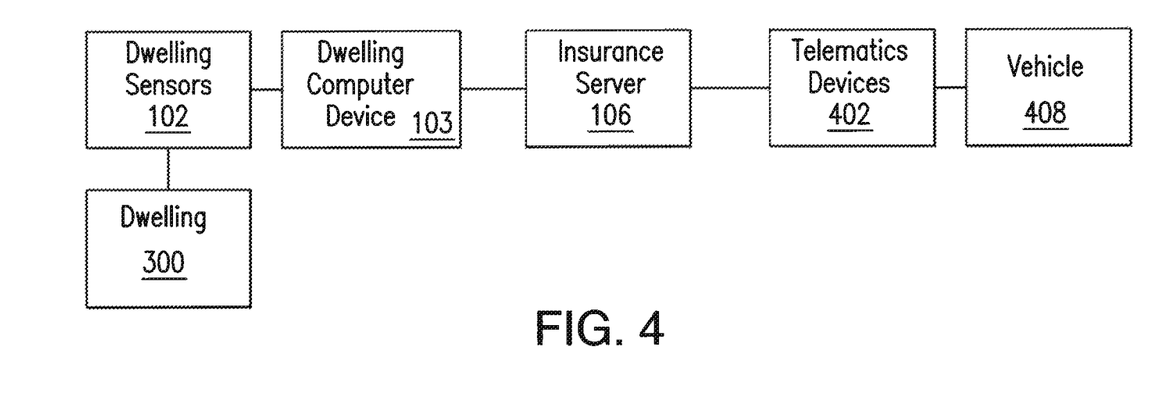
FIG. 4 is a system level diagram illustrating aggregation of data relating to a policyholder's insurance needs.

With reference now to FIG. 4, shown is insurance server 106 coupled to computing device 103 for receiving data from sensors 102 preferably relating to an insured property 300 in accordance with the above description. In addition to being coupled to computing device 103, insurance server 106 is also shown coupled to vehicle telematics device 402. Network 100, and links 105 thereof (FIG. 1), preferably couple server 106 to each of the aforementioned components (e.g., computing device 103 and telematics device 402).

With respect to telematics device 402, it is preferably coupled to one or more user vehicles 408 for receiving telematics and related data/information from each coupled vehicle 408. The configuration, functionality and operability of telematics device 402 is described in commonly assigned U.S. Patent Application Ser. No. 61/881,335 which is incorporated by reference in its entirety herein. It is to be understood and appreciated, telematics device 402 provides user vehicle related information to be aggregated by insurance server 106 as discussed further below.

It should be recognized the data from sensors 102 and telematics device 402 may be utilized by data analyzer 306 to determine a risk profile associated with insured property 300, a vehicle 408, and/or a policyholder associated therewith. Such a risk profile could take the form of a "maintenance score" for a insured property or "driving score" with respect to a vehicle, as will be further described below.

For instance, data from an appliance sensor may be used to determine whether the appliances within a insured property 300 are maintained. If the appliances were maintained regularly within a particular interval, then such maintenance would positively affect the maintenance score. Conversely, if the appliances were not maintained regularly, then the maintenance score would be negatively affected.

In another instance, data from temperature and/or humidity sensors may be used to determine whether an owner (or occupant) of an insured property 300 takes care to control the climate of an insured property in a responsible way. If the owner does control the climate in a responsible way, then such behavior would positively affect the maintenance score, and vice versa.

In another instance, data from a motion sensor may be utilized to determine whether or not there is responsible activity occurring in the insured property 300. For example, regular consistent steady state activity may indicated that an insured property is used solely as a habitat whereas spikes in activity or frenetic activity may indicate that an insured property is not being used solely as a habitat, but may be being used in a manner that creates additional risks or disadvantages for the insured property.

In another instance, data from a leak detection sensor may be used to determine if leaks are repaired promptly or if they are allowed to continue. If leaks are repaired promptly within a time period after which they appear, then this may indicate that an insured property 300 is properly maintained which would positively affect a maintenance score. If leaks are not repaired and are allowed to continue, then this may indicate neglect, which would negatively affect maintenance score.

In another instance, data from vehicle telematics device 402 may be used to determine if a policyholder operates a vehicle 408 responsibly. Such a determination could take the form of a driving score, which would reflect the driving behavior of the policyholder. For instance, if a policyholder observes the speed limit and does not drive recklessly, then the driving score may be positively affected and vice versa.

It should be noted that the preceding examples are provided for illustrative purposes only and should not be construed as limiting. Data analyzer 306 may utilize other data from sensors 102 to calculate a maintenance score. Further, data analyzer 306 may calculate a maintenance score through utilizing one or a combination of multiple data types provided by sensors 102. In addition data analyzer 306 may calculate a single composite score for a policyholder or calculate multiple scores (e.g. one for vehicle 408, one for insured property 300, etc.).

Credit analyzer 307 may utilize credit information to determine risk associated with a particular policyholder. The use of credit information to determine risk associated with an insurance policy is described in commonly assigned U.S. Pat. No. 8,428,972, which is hereby incorporated by reference in its entirety. Credit information in one example may comprise a credit score or credit history. Such information in one example may be received by insurance server 106 over network 100 from a credit bureau. In another example, such information may reside on insurance server 106. For instance, the operator of insurance server 106 may maintain a credit score or credit history for its policyholders. The use of credit information may be used to formulate, maintain, and/or suggest modifications to the terms of an insurance policy.

Credit analyzer 307 may preferably use a rules based model to determine the worthiness of the policy-holder's credit score and/or credit relative to an insurance underwriting, pricing, or other decision to be rendered. This may include determining a weighted value for policy holder's credit score and/or credit history when applied in an analytical decision regarding an insurance underwriting, pricing, or other decision.

For instance, if a policy holder's credit information were to show a decline in credit worthiness, an insurance policy's terms may be adjusted. If a policyholder's credit information were to show an improvement in credit worthiness, then an insurance policy's terms may be adjusted. If a policyholder's credit information were to stay the same, then the terms of an insurance policy may be maintained. Exemplary types of adjustments include, but are not limited to, premium adjustments, deductible adjustments, coverage amount adjustments, and coverage type adjustments.

Credit analyzer 307 in one example may utilize a policyholder's credit information, such as a credit score to determine whether a policy holder's credit information indicates whether or not an underwriting decision should be made to an insurance policy based on credit data. For instance, if a policyholder's credit score decreases, then it may be desirable to increase the policyholder's premium. If the credit score increases, then it may be desirable to decrease the policyholder's premium.

Composite risk analyzer 308 is utilized to make an underwriting decision based on a combination of the data output from data analyzer 306 and credit analyzer 307. For instance, a policyholder's credit information may indicate that an insurance policy premium should increase. However, information output from data analyzer 306 may determine that an increase is not warranted. Composite risk analyzer 308 utilizes data from data analyzer 306 and credit analyzer 307 to determine whether or not an underwriting, pricing, or other decision is warranted. It should be noted that an underwriting, pricing, or other decision may include adjusting or maintaining an existing insurance policy or formulating the terms and conditions of a new insurance policy.

Figure 5:
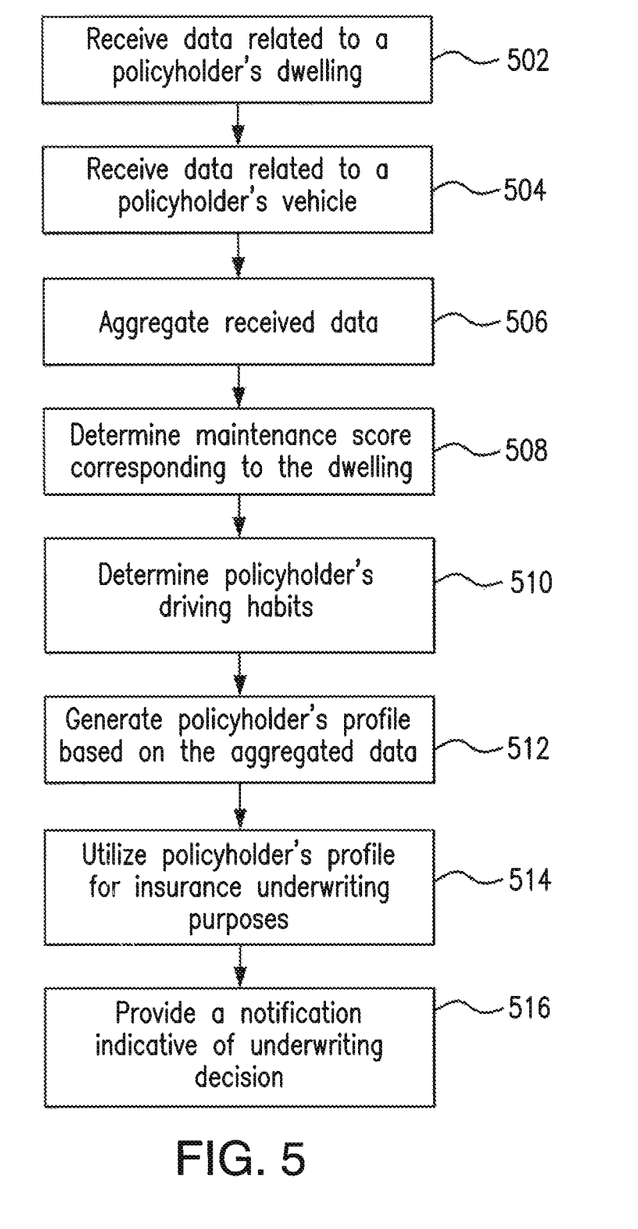
FIG. 5 is a flow diagram of operational steps of the data analyzer module of FIG. 3 in accordance with an illustrated embodiment.

FIG. 5 shows, in the form of a flow chart, exemplary operational steps of the data analyzer 306. Before turning to description of FIG. 5, it is noted that the flow diagram shown therein is described, by way of example, with reference to components shown in FIGS. 1-4, although these operational steps may be carried out in any system and are not limited to the scenario shown in the aforementioned figures. Additionally, the flow diagram in FIG. 5 shows examples in which operational steps are carried out in a particular order, as indicated by the lines connecting the blocks, but the various steps shown in these diagrams can be performed in any order, or in any combination or sub-combination.

With reference to FIG. 5, at 502, data analyzer 306 preferably collects data related to a policyholder's insured property 300 from sensors 102 placed at various locations in and around the insured property 300. In an embodiment of the present invention, this step may involve computing device 103 periodically contacting (via network 100), at prescribed time intervals, data analyzer component 304 running on server 106 to send accumulated data. In an alternative embodiment, contact between the computing device 103 and data analyzer 306 may be initiated when the data analyzer 306 contacts the computing device 103. Following the initial contact, data analyzer 306 may receive data from the computing device 103. It is to be understood data packets collected from sensors 102 can be aggregated in computing device 103 and sent as an aggregated packet to data analyzer 306 for subsequent analysis.

At 504, data analyzer 306 preferably collects telematics data from the telematics device(s) 402 (shown in FIG. 4) that are preferably coupled to one or more policyholder vehicles 408. As previously indicated, the telematics device 402 may be used to monitor a number of aspects of the use of the motor vehicles 408. For example, the telematics device 402 monitors the speed at which the vehicle is travelling. The telematics device 402 may also able to send data related to braking habits of the policyholder (or another driver operating the vehicle 408) either using the GPS functionality or by using an accelerometer or having one or more sensors connected to a deceleration detection device, for example. The telematics device 402 may also be configured and operable to detect the distance travelled and if the vehicle 408 was driven for a long time period without a break. In addition, the times of the day that the vehicle 408 is being driven can be captured as night time driving is statistically more dangerous than day time driving, especially weekend late night driving. According to an embodiment of the present invention, based on the data provided by telematics devices 402, the data analyzer 306 may be able to determine when the vehicle 408 turns without indicating, for example. In any event, the data from the telematics devices 402 may be transmitted to an insurance server 106 over a communication network 100. According to embodiments of the present invention, data analyzer 306 may be configured and operable to process a large amount of telematics data received at 504.

It should be appreciated that in some embodiments steps 502 and 504 may be combined into a single step. In some embodiments, steps 502 and 504 may be changed in terms of order. In some embodiments, one or more additional steps may be included.

According to an embodiment of the present invention, data analyzer 306 may include a parser configured to parse, aggregate and classify the received data (at 506) based on, for example, type of sensor employed to collect a particular subset of the received data. Data analyzer 306 may create a data structure for each classification. Additionally, data analyzer 306 may pre-process and store the captured informatics and telematics data in the data repository 310 (which is shown, in FIG. 3, as being part of, or used by, insurance server 106). Pre-processing the captured data may involve extracting relevant sensor-based information to enable storage thereof in the data repository 310. The data repository 310 may comprise a database or any other suitable storage component. For example, the suitable storage component may comprise, or may otherwise make use of, magnetic or optical disks, volatile random-access memory, non-volatile random-access memory or any other type of storage device.

At 508, data analyzer 306 preferably conducts an analysis to determine a maintenance score value corresponding to the insured property 300. For example, data analyzer 306 may generate the maintenance score value based upon the insured property age, insured property type and any repair and/or maintenance needs. It is noted that repair/maintenance needs may include, but not limited to, immediate repair needs and preventive maintenance needs. In general, any insured property condition that affects the residents' health or safety may be considered by data analyzer 306 as requiring an immediate repair. For instance a hole may have been detected in the roof of insured property 300 (via one or more sensors 102), requiring immediate repair. As another example, an environmental sensor may have detected a gas leak or any contaminant adverse to human health. As an example of preventive maintenance needs, based upon an air flow analysis, data analyzer 306 may have detected that damaged frames and/or dividers allow air leaks into insured property 300. Thus, data analyzer 306 may consider window replacement as a preventive maintenance factor in calculation of the maintenance score value. The generated maintenance score may be represented in the form of a numerical value, such as a value ranging from 0 to 5 for each of the factors, as well as a combined (average or weighted average) aggregate score.

According to an alternative embodiment of the present invention, at 508, data analyzer 306 may generate a maintenance profile corresponding to the insured property 300 based on the received informatics data. The maintenance profile may include both immediate repair needs and preventive maintenance needs. For example, the generated maintenance profile may indicate that electrical wiring system is so old that it needs an immediate upgrade. As another example, the maintenance profile may point out that gas heating boiler has not received its annual service. In addition, the maintenance profile may include forward maintenance plans, for instance, for the next five to seven years, establishing, for example, the date of the next re-painting job, the date of the next windows replacement job, and the like. Furthermore, the generated maintenance profile may include detailed information about all necessary and planned repairs.

At 510, data analyzer 306 preferably conducts an analysis to determine policyholder's driving score based on compiled historical telematics data. The policyholder's driving habits can include preferred driving speed, preferred driving speed for a particular roadway, preferred driving speed for a particular speed limit, preferred cruise control speed, preferred lane change frequency, preferred headway distance, preferred lane change space, and/or other data. In this step data analyzer 306 may also determine braking habits of the policyholder (or another driver operating the vehicles 408). In addition, data analyzer 306 may also evaluate the times of the day that the vehicle 408 is being driven, as night time driving is statistically more dangerous than day time driving, especially weekend late night driving. According to an embodiment of the present invention, based on the data provided by telematics devices 402, the data analyzer 306 may be able to determine when the vehicle 408 turns without indicating, for example. According to yet another embodiment of the present invention, at 510, data analyzer 306 may assess other information indicative of vehicle operation and maintenance including, but not limited to, tire pressure, mileage, treadwear, and vehicle oil change history.

It should be appreciated that in some embodiments, at 512, data analyzer 306 may integrate analysis performed at 508 and 510 to generate a policyholder profile or score corresponding to the policyholder associated with the insured property 300 and vehicle 408. In some embodiments, the policyholder profile may include material, geographical, and/or behavioral attributes that may influence the probability that a policyholder may personally experience or cause an insured loss. For example, the policyholder profile may include a policyholder's name, address, phone number, and birth date. Other policyholder profile data may include policyholder risk attributes and a claim history. Policyholder risk attributes may include data that indicates the policyholder, residents, or any individual connected to the policy (e.g., persons residing in, working in, or otherwise using the insured property 300, persons driving the vehicles 408 associated with the policy) have an increased or decreased probability to experience a fire or other loss to the insured property 300 and/or experience any loss to the insured vehicle 408. The policyholder risk attributes may include demographic (e.g., marital status, age, etc.), geographic (e.g., urban, suburban, rural, etc.), and behavioral (e.g., poor maintenance score/profile, high risk driving habits, etc.) attributes of the policyholder or other residents/drivers. The claim history may also indicate a type of risk for the insurer as policyholders with more numerous claims may indicate a higher probability of experiencing a property loss than policyholders with fewer claims.

In step 514, credit analyzer 307 makes a determination as to whether or not a policy holder's credit information, such as credit history or credit score, should be used to make an underwriting, pricing, or other decision (e.g. increase premium, decrease premium, increase deductible, etc.)

In step 516, if credit analyzer 307 determines that credit information should be utilized to make an underwriting decision, composite risk analyzer 308 is utilized to harmonize the data from data analyzer 306 and credit analyzer 307. For instance, composite risk analyzer 308 may determine that despite a policyholder's credit history indicating that a premium should be increased, the policy holder's profile, maintenance score and/or driving scores are indicative of the user being responsible in maintenance of the user's dwelling, vehicle, and/or health. Accordingly, the composite risk analyzer 308 may make the determination that no (or less of an) adjustment is warranted. In another instance, the composite risk analyzer 308 may make a determination that although the policyholder's maintenance score and/or driving scores are high, the policy holder's credit information is so deficient that an underwriting, pricing, or other decision is warranted. In another instance, composite risk analyzer 308 is utilized to verify a decision made by data analyzer 306 or credit analyzer 307. For instance, if data analyzer 306 make a decision that the maintenance score of an insured property 300 is sufficiently low that a premium increase is warranted, composite risk analyzer 308 may be utilized to verify that data from credit analyzer 307 supports such an interpretation. Conversely, if credit analyzer 307 determines that an adjustment is necessary, then composite risk analyzer 308 may be utilized to verify that data from data analyzer 306 supports such an interpretation.

It should be appreciated that in some embodiments data analyzer 306, credit analyzer 307, and/or composite risk analyzer 308 may be integrated with other sub-modules within the data analysis module 304, as well as other modules (not shown in FIG. 3), such as a user interface module, that may comprise or may otherwise make use of the insurance server 106. The analysis performed by data analyzer 306, credit analyzer 307, and/or composite risk analyzer 308 (e.g., at 508-516) may be used for various insurance underwriting, pricing, and other purposes. For example, the aforementioned insurance underwriting purposes may include underwriting decisions related to at least one of health insurance products, property insurance products, life insurance products, vehicle insurance products, long term disability insurance products, and the like. In an embodiment of the present invention data analyzer 306, credit analyzer 307, and/or composite risk analyzer 308 may identify one or more insurance purposes based on, for example, interaction with the user interface module and may use the policyholder profile generated at 512 to make a corresponding underwriting, pricing, or other decision.

As was described above, one type of underwriting decision that may be made is a premium amount, deductible amount, coverage amount, and/or coverage term of an insured property 300. Another type of decision that may be made is an underwriting decision related to a vehicle (i.e., vehicle 408). For example, an insurance company may collect vehicle and credit data about a vehicle and one or more drivers associated with the vehicle to determine whether to continue insuring that vehicle, or to set the premium for insuring the vehicle. Another type of decision that may be made based is a life insurance underwriting decision. For example, composite risk analyzer 308 may facilitate the evaluation of the risk associated with a prospective policyholder (based on the aggregated data included in the policyholder's profile and credit information) against the insurer's underwriting criteria to determine the terms and conditions on which to offer life insurance coverage. Still another type of decision may involve providing recommendations related to a combined homeowner's and vehicle insurance policy, for example. For instance, composite risk analyzer 308 may consider credit information in conjunction with all risk parameters associated with homeowner's insurance in combination with one or more risk parameters related to a vehicle insurance policy based on the aggregated data contained in the policyholder's profile. In response, composite risk analyzer 308 may make certain recommendations, such as, but not limited to, a premium increase or discount, with respect to the combined homeowner's and vehicle insurance policy.

It should be appreciated that the specific decisions that are discussed above by no means constitute an exhaustive list. Any type of determination related to one or more insurance related products, such as health insurance products, property insurance products, vehicle insurance products, long term disability insurance products, and the like may be made by data analyzer 306 based upon the aggregated informatics and telematics data.

At 518, composite risk analyzer 308 preferably provides a notification indicative of one or more above-described underwriting, pricing, or other decisions made by data analyzer 308. It is to be appreciated that composite risk analyzer 308 may be configured to electronically deliver all notifications regarding corresponding determinations. The notification can be anything that advises a policyholder, device, or computer system of the one or more matters, including but not limited to, a display of text on a local display screen, a message in an email sent to a local or remote computer, a text message, a communication to a remote computer system. It is to be also understood and appreciated that composite risk analyzer 308 may be configured and operational to integrate with policyholder's communicative computing devices (e.g., smart phones (via an app), computers, tablets, smart TV's, vehicle communication systems, kitchen communication systems, etc.) for sending such notifications regarding such suggested insurance policy modifications. In an embodiment of the present invention, each notification may include, but not limited to, recommended insurance products, adjusted coverage limits and premiums, liability coverage adjustments, and the like.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features.

The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A sensor system for capturing data, the sensor system comprising:
    a dwelling sensor device comprising a transmitter coupled to a wireless network, the dwelling sensor device configured to:
        capture an attribute of a dwelling associated with a user, and
        transmit the attribute of the dwelling associated with the user via the transmitter;
    a telematics device comprising a transmitter device and configured to:
        capture telematics data relating to a vehicle associated with the user, and
        transmit the telematics data relating to the vehicle via the transmitter device;
    a data storage component wirelessly coupled to the dwelling sensor device via the wireless network, the data storage component configured to:
        receive, from the dwelling sensor device, the attribute of the dwelling, and
        aggregate the attribute of the dwelling over a period of time;
    a communication component coupled to the data storage component configured to:
        transmit the aggregated attribute of the dwelling; and
    a computer management module coupled to the communication component, via the wireless network, and programmed to:
        receive the aggregated attribute of the dwelling from the communication component;
        receive the telematics data from the telematics device;
        determine a driving score based on the telematics data, wherein the driving score reflects driving behaviors of the user;
        determine a state of activity in the dwelling based on an analysis of the attribute of the dwelling aggregated for the period of time, wherein the state of activity indicates a frequency of use of the dwelling by the user; and
        determine a value indicative of a risk associated with the user based upon an analysis of the driving score and the state of activity in the dwelling.

2. The sensor system as recited in claim 1, wherein the computer management module is further configure to render a decision regarding the user contingent upon the value indicative of a risk associated with the user.

3. The sensor system as recited in claim 2, wherein the decision relates to at least one of health insurance products, property insurance products, life insurance products, vehicle insurance products, and long term disability insurance products.

4. The sensor system as recited in claim 1, wherein the computer management module is further programmed to aggregate the telematics data over a second period of time.

5. The sensor system as recited in claim 4, wherein the driving score is further based upon the aggregate the telematics data.

6. A computer-implemented method for determining a value indicative of a risk associated with a user, the method comprising:
   receiving, over a period of time from a plurality of dwelling sensor devices, a plurality of attributes of a dwelling associated with a user;
   receiving, over the period of time from a telematics device, telematics data relating to a vehicle associated with the user;
   determining a driving score based on the telematics data, wherein the driving score reflects driving behaviors of the user;
   determining a state of activity in the dwelling based on an analysis of the attributes of the dwelling, wherein the state of activity indicates a frequency of use of the dwelling; and
   determining a value indicative of a risk associated with the user based upon an analysis of the driving score and the state of activity in the dwelling.

7. The computer-implemented method of claim 6 further comprising rendering a decision regarding the user contingent upon the value indicative of a risk associated with the user.

8. The computer-implemented method of claim 7, wherein the decision relates to at least one of health insurance products, property insurance products, life insurance products, vehicle insurance products, and long term disability insurance products.

9. The computer-implemented method of claim 6, further comprising determining a maintenance score for the dwelling based on the attributes of the dwelling.

10. The computer-implemented method of claim 9, wherein the value indicative of a risk associated with the user is further based upon the maintenance score.

11. The computer-implemented method of claim 9, wherein the attributes of the dwelling indicate a maintenance interval for an appliance in the dwelling.

12. The computer-implemented method of claim 9, wherein the attributes of the dwelling indicate a promptness of leak detection in the dwelling.

* * * * *

UNITED STATES PATENT AND TRADEMARK OFFICE
CERTIFICATE OF CORRECTION

| | | |
|---|---|---|
| PATENT NO. | : 9,818,158 B1 | Page 1 of 1 |
| APPLICATION NO. | : 14/305732 | |
| DATED | : November 14, 2017 | |
| INVENTOR(S) | : Ramsey Devereaux et al. | |

It is certified that error appears in the above-identified patent and that said Letters Patent is hereby corrected as shown below:

In the Specification

Column 1, Line 9, delete "Nos." and insert -- Nos.: --, therefor.

In the Claims

Column 21, Claim 5, Line 12, delete "the aggregate the telematics data." and insert -- the aggregated telematics data. --, therefor.

Signed and Sealed this
First Day of May, 2018

Andrei Iancu
*Director of the United States Patent and Trademark Office*